M. WALKER & E. MINER.

PORTABLE BRICK HACK.

No. 10,694. Reissued Feb. 23, 1886.

Witnesses

S. G. Fischer

H. B. Wyman

Inventors

Malcom Walker and

Ephraim Miner

By his Attorney

L. Deane

N. PETERS, Photo-Lithographer, Washington, D. C.

UNITED STATES PATENT OFFICE.

MALCOM WALKER AND EPHRAIM MINER, OF YANKTON, DAKOTA TERRITORY.

PORTABLE BRICK-HACK.

SPECIFICATION forming part of Reissued Letters Patent No. 10,694, dated February 23, 1886.

Original No. 326,812, dated September 22, 1885. Application for reissue filed December 31, 1885. Serial No. 187,312.

*To all whom it may concern:*

Be it known that we, MALCOM WALKER and EPHRAIM MINER, of Yankton, in the county of Yankton and Territory of Dakota, have invented certain new and useful Improvements in Brick Hacks and Carriages; and we do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
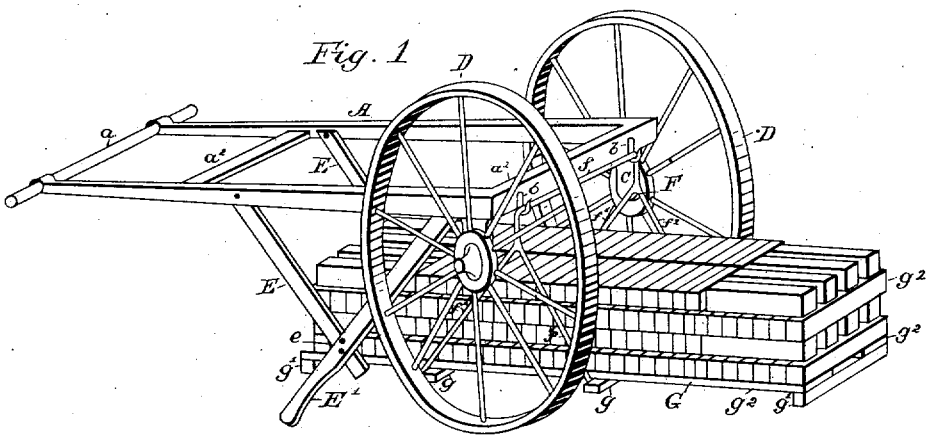
Figure 2:
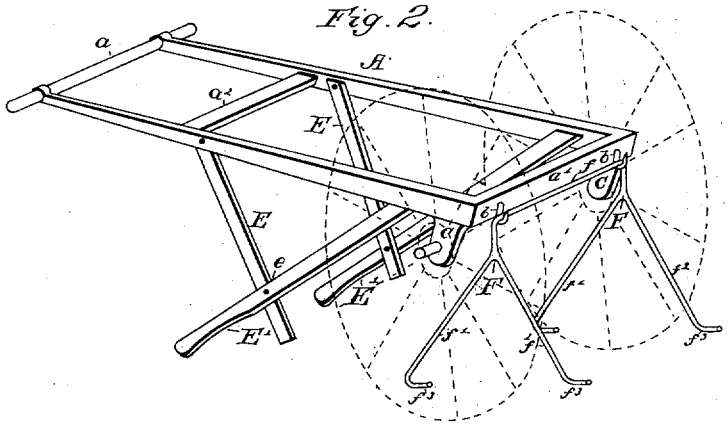

Figure 1 is a perspective view of this device as in use. Fig. 2 is a perspective view of the frame and carriage ready for taking up the hack.

The object of our invention is to provide a means whereby a large number of bricks may be easily carried from place to place in a brick-yard or other place with no more help than is ordinarily employed to carry a much smaller quantity.

Another object of our invention is to provide a device for carrying bricks, which shall be so efficient as to render the accidental dropping of a brick-hack full of bricks practically impossible.

In the usual way of carrying bricks from the yard to the kiln, or vice versa, there is much danger of accidental stumbling and consequent dropping of bricks, which, besides being the source of much annoyance, is very disadvantageous, as much time is thus lost, and the loss caused by the breaking of bricks is also considerable. Again, by carrying the bricks in the hands in the old way all of the strain comes directly on the arms of the carrier, and he can only carry a comparatively small number of bricks, whereas by the employment of our device the same person can carry many times the number which he could carry in his arms or on a hack in his hands, and with absolute safety as regards accidental dropping—first, because the hack, when being carried by our device, is so close to the ground that the fall would cause no material concussion, and, second, because the person using the machine, even if he were to fall, would not drop the bricks, as the machine will support the bricks independent of the operator.

This device is designed especially for handling or moving "green bricks." By any other device for that purpose that we know of the green bricks, (that is, the freshly-molded,) when taken from the machine, are placed into a flat wheelbarrow and carried to the yard, where they are taken from the wheelbarrow and hacked up. When they are dried, they are again loaded on the wheelbarrow, to be taken to the kiln. By the present invention they are placed directly from the machine upon the hack and wheeled to the yard, set down, dried, and then taken by the carriage to the kiln. Thereby a large part of the labor in loading and unloading the hack is avoided, and in a large brick-yard at least fifty per cent. of this kind of labor is saved.

Having set forth the main object of our invention, we will now proceed to describe it in detail.

It consists in a novel construction of the hack and carriage and in the combination of parts, which will be hereinafter explained, and more especially pointed out in the claims.

In the accompanying drawings, A designates the carriage, secured together by any suitable number of cross-bars, $a$ $a'$ $a^2$, the front one, $a$, of which is used as a handle in raising or lowering the frame or moving the carriage. The rear bar, $a'$, has on its outer sides the hooks $b$, the purpose of which will be described hereinafter. At the rear end of the carriage A are two eccentric crank-arms, C C—one on each side—the lower outer ends of which form the axles for the wheels D D.

Extending diagonally downward and backward from the side bars of carriage A are the braces E E—one on each side—and from the rear of the same bars are a pair of secondary braces, E′ E′—one on each side—extending diagonally downward and forward and crossing the arms E E at $e$. This portion of the device we call the "cart" or "carriage." The skeleton frame F, preferably made of strong wire, is hung by its horizontal bar or piece $f$, or in any suitable way, upon the hooks $b$ on the rear bar of the carriage A. Each of the flaring wires or bars $f'$ $f^2$ on each side has hooked ends $f^3$. These ends are adapted to engage under the ends of the bars $g$, projecting on each side of the hack G. This hack is made of cross-pieces $g$ and $g'$ and longitudinal strip $g^2$, secured upon them. The cross pieces $g$ are at equidistance from the center, and when the ends of frame F engage under the projecting ends of said pieces and the hack is lifted thereby it will be well balanced for moving. All these pieces are preferably of the same depth, and support the hack at a little distance above the ground, and thus keep the ends of the pieces $g$ ready for the engagement with the depending ends of the frame F.

It will be observed that when the carriage is in the position shown in dotted lines in Fig. 2, the front end of the carriage A being raised, the rear of the frame will be lowered and the frame F will come nearer to the ground, and so ready for its ends to be engaged on the side projections of the brick-hack.

The operation of this device is as follows: The hack being properly filled or loaded with brick, the carriage is wheeled up to the end of the hack and is moved along over it, the wheels being astride the hack. Then by lifting up the forward part of the frame the ends $f^3$ of the frame F are lowered and can be engaged under the side projections of the hack. Now, by pressing down on the front bar or handle of carriage A the ends of the longer downwardly-projecting side bars will be the fulcra on which the frame F will be caused to raise the hack till it swings free from the ground and the load of bricks is in a position to be wheeled away. To unload, reverse the above operation.

It is evident that in the mere detail of construction of the several parts there may be many merely mechanical changes in the above construction, which will in no manner change the nature or scope of our invention.

What we desire to secure by Letters Patent, and what we really do claim, is—

1. In a brick-carrying device, the combination of the main frame and the eccentric crank-arm with the wheels and suitable supports and supporting-frame for the hack, as set forth.

2. In a brick-carrying device, the combination of the main frame, the wheels, and crank-arms with the hooks $b$ $b$ at the front end of the frame, and frame F, having the hooked ends, as set forth.

3. In a brick-carrying device, the frame, the cross-bars $a$ and $a'$, the hooks $b$ $b$ on the latter forward of the axle-supports or eccentric arms, and the hooked rods F F with the arms $f'$ $f^2$, as set forth.

4. In a brick-carrying device, the main frame having side braces or supports, E E', the latter serving the double purpose of a brace and a supplemental handle, the crank-axles C, the hooks $b$ $b$, and the hooked rods F F, all combined in the manner and for the purposes set forth.

5. The brick-hack G, consisting of the longitudinal boards or pieces $g^2$, end pieces, $g'$, and cross-pieces $g$, about equidistant from the center and having projecting arms, substantially as and for the purposes described.

6. A brick-hack, substantially as described, having a longitudinal floor and supporting end pieces and provided with side projections, whereby it can be lifted and carried, substantially as described.

7. The combination of the carriage A, as described, and frame F with the hack G, substantially in the manner and for the purposes set forth.

In testimony whereof we affix our signatures in presence of two witnesses.

MALCOM WALKER.
EPHRAIM MINER.

Witnesses:
EDWARD C. DUDLEY,
DANL. N. GROSS.